US012801134B2

(12) United States Patent
Jornod et al.

(10) Patent No.: US 12,801,134 B2
(45) Date of Patent: Nov. 17, 2026

(54) METHODS, COMPUTER PROGRAMS AND APPARATUS FOR PERFORMING A TELEOPERATED DRIVING SESSION

(71) Applicant: Volkswagen Aktiengesellschaft, Wolfsburg (DE)

(72) Inventors: Guillaume Jornod, Berlin (DE); Andreas Pfadler, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 232 days.

(21) Appl. No.: 18/547,554

(22) PCT Filed: Feb. 22, 2022

(86) PCT No.: PCT/EP2022/054388
§ 371 (c)(1),
(2) Date: Aug. 23, 2023

(87) PCT Pub. No.: WO2022/180027
PCT Pub. Date: Sep. 1, 2022

(65) Prior Publication Data

US 2024/0053744 A1 Feb. 15, 2024

(30) Foreign Application Priority Data

Feb. 24, 2021 (EP) .................................... 21159108

(51) Int. Cl.
*H04W 24/02* (2009.01)
*G05D 1/00* (2024.01)
*H04W 4/44* (2018.01)

(52) U.S. Cl.
CPC ......... *G05D 1/0022* (2013.01); *G05D 1/0038* (2013.01); *H04W 4/44* (2018.02); *H04W 24/02* (2013.01)

(58) Field of Classification Search
CPC ..... G05D 1/0022; G05D 1/0038; H04W 4/44; H04W 24/02; H04Q 2209/823; H04Q 9/00; G08C 17/02
(Continued)

(56) References Cited

U.S. PATENT DOCUMENTS

2014/0207535 A1* 7/2014 Stefan .............. G06Q 10/06398 701/1
2019/0049948 A1* 2/2019 Patel .................... G05D 1/0038
(Continued)

FOREIGN PATENT DOCUMENTS

DE 102019204943 A1 10/2020 ............ B60W 40/02
EP 3742767 A1 11/2020 ............... G05B 1/00
(Continued)

OTHER PUBLICATIONS

Extended European Search Report, Application No. 21159108.6, 10 pages.
(Continued)

*Primary Examiner* — Anshul Sood
*Assistant Examiner* — Shien Ming Chou
(74) *Attorney, Agent, or Firm* — Slayden Grubert Beard PLLC

(57) ABSTRACT

Methods, computer programs and apparatus for performing a tele-operated driving session The present invention is related to methods, computer programs, and apparatus for performing a tele-operated driving session for a vehicle equipped with an automated driving function. The invention is further related to a vehicle equipped with an automated driving function, which makes use of such a method or apparatus. In a first step, a predictive quality of service for a communication between the vehicle and a control center for a route driven in a tele-operated driving session is analyzed (10). Bases on this analysis, a section of the route
(Continued)

for which an indirect control shall be used is determined (11). Furthermore, control data to be used by the vehicle in the determined section of the route are determined (12). At least the control data are then sent (13) to the vehicle before or after initiating a tele-operated driving session with direct control of the vehicle.

12 Claims, 6 Drawing Sheets

(58) Field of Classification Search
USPC .............................................................. 701/2
See application file for complete search history.

(56) References Cited

U.S. PATENT DOCUMENTS

| | | | |
|---|---|---|---|
| 2020/0004240 A1 | 1/2020 | Biehler et al. | |
| 2020/0041995 A1 | 2/2020 | Quillin | |
| 2020/0062267 A1 | 2/2020 | Magzimof et al. | |
| 2020/0112907 A1 | 4/2020 | Dao et al. | |
| 2020/0260334 A1 | 8/2020 | Gangakhedkar et al. | |
| 2021/0116907 A1* | 4/2021 | Altman | B60W 30/16 |
| 2021/0231447 A1* | 7/2021 | Ahmed | G01C 21/3446 |
| 2021/0255617 A1* | 8/2021 | Jornod | G05D 1/0022 |
| 2022/0075366 A1 | 3/2022 | Blank et al. | |

FOREIGN PATENT DOCUMENTS

| | | | | |
|---|---|---|---|---|
| EP | 3742767 B1 * | 8/2022 | H04L 41/147 |
| EP | 4050450 A1 | 8/2022 | G05D 1/02 |
| WO | 2019/180700 A1 | 9/2019 | G05D 1/00 |
| WO | 2019/234103 A1 | 12/2019 | G05D 1/02 |
| WO | 2022/180027 A1 | 9/2022 | G05D 1/02 |

OTHER PUBLICATIONS

International Search Report and Written Opinion, Application No. PCT/EP2022/054388, 13 pages.

* cited by examiner

METHODS, COMPUTER PROGRAMS AND APPARATUS FOR PERFORMING A TELEOPERATED DRIVING SESSION

CROSS-REFERENCE TO RELATED APPLICATIONS

This application claims priority to European Patent Application No. EP 21159108.6, filed on Feb. 24, 2021 with the European Patent Office. The contents of the aforesaid Patent Application are incorporated herein for all purposes.

TECHNICAL FIELD

The present disclosure is related to methods, computer programs, and apparatus for performing a tele-operated driving session for a vehicle equipped with an automated driving function. The disclosure is further related to a vehicle equipped with an automated driving function, which makes use of such a method or apparatus.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Tele-operated driving is gathering more and more interest. Tele-operated driving in the present context means that an external operator controls a vehicle remotely. The external operator is located in a control center. There may be a large distance between the control center and the vehicle. The control center and the vehicle are connected via a radio communication system and its backhaul. Primarily, the radio communication system is part of a public mobile communication system such as LTE (Long Term Evolution) or 5G.

Tele-operated driving belongs to safety-related time-critical applications. Main requirements for the exchange of information are low latency, high data rate, and high reliability.

Autonomous driving, also referred to as automatic driving, automated driving, or piloted driving, is the movement of vehicles, mobile robots and driverless transport systems that are largely autonomous. There are different degrees of autonomous driving. In Europe, various transport ministries, for example the Federal Institute for Road Systems (Bundesanstalt für Straßenwesen) in Germany, have defined the following autonomous stages:

- Level 0: “Driver only”, the driver drives himself, steers, accelerates, brakes, etc.
- Level 1: Certain assistance systems help with vehicle operation, including a cruise control system such as ACC (Automatic Cruise Control).
- Level 2: Partial automation. Therein, automatic parking, tracking function, general longitudinal guidance, acceleration, deceleration, etc. are taken over by the assistance systems, including collision avoidance.
- Level 3: High automation. The driver does not have to monitor the system continuously. The vehicle independently performs functions such as the triggering of the turn signal, lane change and tracking. The driver can turn to other things, but if requested, the driver has to take over control within a pre-warning period.

- Level 4: Full automation. The guidance of the vehicle is permanently performed by the system. If the system is no longer able to handle the tasks, the driver can be asked to take over control.
- Level 5: No driver required. Apart from setting the target and starting the system, no human intervention is required.

A slightly different definition of levels is known from the Society of Automotive Engineers (SAE). In this regard, reference is made to the SAE J3016 standard. Such definitions could also be used instead of the above given definition.

Tele-operated driving might become a key technology in order to solve issues with Level 4 and Level 5 driven vehicles. A vehicle driving autonomously makes its decisions based on the perception of its environment as well as on predefined traffic regulations. However, it may happen that an autonomous vehicle is no longer able to continue its planned route, e.g., due to an incorrect interpretation of the environment, sensor failures, poor road conditions, or unclear traffic conditions, e.g., an accident or a construction site. In such situations, the vehicle needs external instructions from someone else to solve the situation, e.g., the external operator located in the control center. The vehicle will be driven remotely by the external operator during a tele-operated driving session until the vehicle can resume its autonomous driving operation.

To operate this remote control, data is exchanged through a cellular network. The quality of the uplink connection for the transmission of perception data and the downlink connection for the transmission of control data, also named quality of service (QoS), has a dramatic impact on the quality of application (QoA). The most important key performance indicators for tele-operations are latency and data rate of the communication network, e.g. a 4G network.

Two modes of tele-operated driving co-exist. A first mode is direct control, in which the control center controls the steering and throttle of the car. A second mode is indirect control, in which the control center gives high-level commands, such as waypoints or modifications of the environmental model. Direct control has higher requirements on the communication service, as the direct commands need to arrive as a real time stream at the vehicle under control.

During a tele-operated driving session with direct control, the quality of service may drop below and not meet the quality of service requirements anymore. In this case, the vehicle under control has to stop to put itself in a safe state. If the quality of service meets the requirements again at a later stage, the tele-operated driving session may continue. In some instances, it may even be necessary to start a new tele-operated driving session.

SUMMARY

A need exists to provide improved solutions for performing a tele-operated driving session for a vehicle, which avoids an inefficient interruption of the tele-operated driving session. The need is addressed by the subject matter of the independent claims. Embodiments of the invention are described in the dependent claims, the following description, and the drawings.

DESCRIPTION

Figure 1:
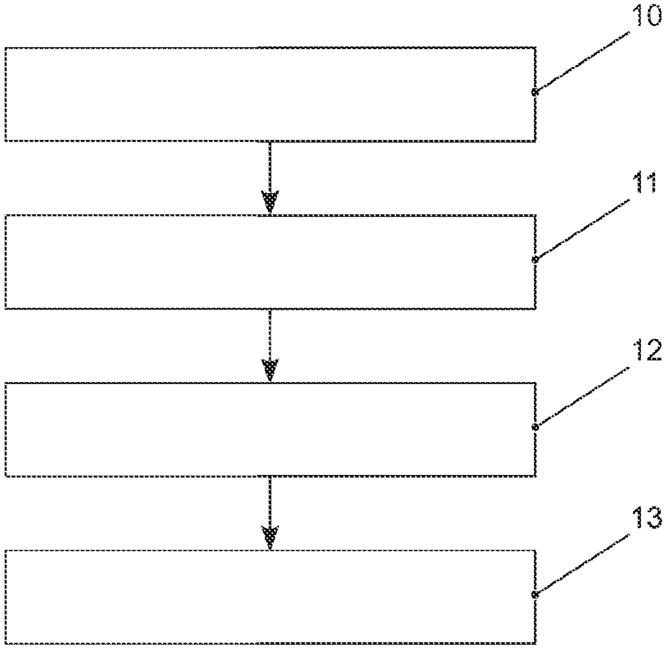
FIG. 1 schematically illustrates an example method implemented in a control center for performing a tele-operated driving session for a vehicle equipped with an automated driving function.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to some embodiments, a method for performing a tele-operated driving session for a vehicle equipped with an automated driving function comprises:

- analyzing a predictive quality of service for a communication between the vehicle and a control center for a route driven in a tele-operated driving session;
- determining a section of the route for which an indirect control shall be used, in which high-level commands are used;
- determining control data to be used by the vehicle in the determined section of the route;
- initiating a tele-operated driving session with direct control of the vehicle, in which steering and throttle of the vehicle are controlled;
- sending at least the control data to the vehicle before the vehicle reaches a beginning of the section of the route with indirect control;
- switching from direct control to indirect control when the vehicle reaches the beginning of the section of the route with indirect control; and
- switching from indirect control to direct control when the vehicle reaches an end of the section of the route with indirect control.

Accordingly and in some embodiments, a computer program comprises instructions, which, when executed by at least one processor, cause the at least one processor to perform the following for performing a tele-operated driving session for a vehicle equipped with an automated driving function:

- analyzing a predictive quality of service for a communication between the vehicle and a control center for a route driven in a tele-operated driving session;
- determining a section of the route for which an indirect control shall be used, in which high-level commands are used;
- determining control data to be used by the vehicle in the determined section of the route;
- initiating a tele-operated driving session with direct control of the vehicle, in which steering and throttle of the vehicle are controlled;
- sending at least the control data to the vehicle before the vehicle reaches a beginning of the section of the route with indirect control;
- switching from direct control to indirect control when the vehicle reaches the beginning of the section of the route with indirect control; and
- switching from indirect control to direct control when the vehicle reaches an end of the section of the route with indirect control.

The term computer has to be understood broadly. In particular, it also includes workstations, distributed systems and other processor-based data processing devices.

The computer program code can, for example, be made available for electronic retrieval or stored on a computer-readable storage medium.

According to some embodiments, an apparatus for performing a tele-operated driving session for a vehicle equipped with an automated driving function comprises:

- an analyzing module configured to analyze a predictive quality of service for a communication between the vehicle and a control center for a route driven in a tele-operated driving session;
- a processing module configured to determine a section of the route for which an indirect control shall be used, in which high-level commands are used, and to determine control data to be used by the vehicle in the determined section of the route; and
- a communication module configured to send at least the control data to the vehicle before the vehicle reaches a beginning of the section of the route with indirect control;

wherein the apparatus is further configured to:

- initiate a tele-operated driving session with direct control of the vehicle, in which steering and throttle of the vehicle are controlled;
- switch from direct control to indirect control when the vehicle reaches the beginning of the section of the route with indirect control; and
- switch from indirect control to direct control when the vehicle reaches an end of the section of the route with indirect control.

From the point of view of the control center, use is made of a recent concept in communications, namely predictive quality of service. According to this concept, the future quality of service is estimated and made available as a basis for decisions or adaptations. The predictive quality of service is now used to determine a problematic drop in the quality of service. The quality of service can drop for multiple reasons, such as white spots in the coverage map, temporary channel overload, temporary network congestion, etc. These factors can be predicted by the communication service and provided within the predictive quality of service.

Using this information, the control center can know in advance that during a specific part of the route driven during the tele-operated driving session direct control will not be possible. Therefore, the control mode, i.e., the mode of tele-operated driving, is temporarily changed from direct control to indirect control in order to enable the vehicle to pass through this unfavorable part of the route. To avoid any interruption of the tele-operated driving session, control data to be used by the vehicle in this section is provided to the vehicle before the section is reached.

In some embodiments, the section of the route for which an indirect control shall be used is determined by detecting a drop of the predictive quality of service below a threshold. For a tele-operated driving session with direct control, a defined minimum quality of service is needed. By detecting a drop in the quality of service below this defined minimum, a section that requires indirect control can easily be determined.

In some embodiments, the predictive quality of service is provided by the vehicle or by a communication network. The estimation of the quality of service can be performed at the vehicle or be provided by the communication network. The latter case has the benefit that the communication network has access to a larger amount of information, such as radio maps, instant radio resource utilization, historical utilization, etc.

In some embodiments, the control data comprises a set of waypoints or one or more trajectories. When the tele-operated driving session is switched to indirect control, the automated driving function of the vehicle has to make use of the control data to continue along the route. One solution for enabling the automated driving function to continue operation is to provide a trajectory that the vehicle shall follow. Another solution is to provide waypoints, which are located on a trajectory. The automated driving function then sequentially approach the various locations.

In some embodiments, trigger and stop times, trigger and stop positions, or switching signals are sent to the vehicle. Various possibilities exist for switching the control mode from direct control to indirect control and later back to direct control. For example, trigger and stop times may be used. The trigger time corresponds to the temporal beginning of the quality of service drop period. The stop time corresponds to the temporal end of the quality of service drop period. Alternatively, trigger and stop positions may be used. The trigger position corresponds to the spatial beginning of the quality of service drop section. The stop position corresponds to the spatial end of the quality of service drop section. A further possibility is to provide dedicated switching signals at the beginning and the end of the indirect control section.

According to some embodiments, a method for performing a tele-operated driving session for a vehicle equipped with an automated driving function comprises:

- requesting a tele-operated driving session;
- receiving control data for an indirect control, in which high-level commands are used, for a section of a route driven in the tele-operated driving session before the vehicle reaches a beginning of the section of the route with indirect control;
- switching from direct control, in which steering and throttle of the vehicle are controlled, to indirect control when the vehicle reaches a beginning of the section of the route with indirect control; and
- switching from indirect control to direct control when the vehicle reaches an end of the section of the route with indirect control.

Accordingly and in some embodiments, a computer program comprises instructions, which, when executed by at least one processor, cause the at least one processor to perform the following for performing a tele-operated driving session for a vehicle equipped with an automated driving function:

- requesting a tele-operated driving session;
- receiving control data for an indirect control, in which high-level commands are used, for a section of a route driven in the tele-operated driving session before the vehicle reaches a beginning of the section of the route with indirect control;
- switching from direct control, in which steering and throttle of the vehicle are controlled, to indirect control when the vehicle reaches a beginning of the section of the route with indirect control; and
- switching from indirect control to direct control when the vehicle reaches an end of the section of the route with indirect control.

The term computer has to be understood broadly. In particular, it also includes electronic control units, embedded devices and other processor-based data processing devices.

The computer program code can, for example, be made available for electronic retrieval or stored on a computer-readable storage medium.

According to some embodiments, an apparatus for performing a tele-operated driving session for a vehicle equipped with an automated driving function comprises:

- a communication module configured to request a tele-operated driving session and to receive control data for an indirect control, in which high-level commands are used, for a section of a route driven in the tele-operated driving session before the vehicle reaches a beginning of the section of the route with indirect control; and
- a control module configured to switch from direct control, in which steering and throttle of the vehicle are controlled, to indirect control when the vehicle reaches a beginning of the section of the route with indirect control, and to switch from indirect control to direct control when the vehicle reaches an end of the section of the route with indirect control.

From the point of view of the vehicle to be controlled, the vehicle receives information that during a specific part of the route driven during a tele-operated driving session direct control will not be possible. Therefore, the control mode, i.e., the mode of tele-operated driving, is temporarily changed from direct control to indirect control in order to enable the vehicle to pass through this unfavorable part of the route. To avoid any interruption of the tele-operated driving session, control data to be used by the vehicle in this section is received by the vehicle before the section is reached.

In some embodiments, the section of the route with indirect control is a section with a drop of a predictive quality of service below a threshold. For a tele-operated driving session with direct control, a defined minimum quality of service is needed. By detecting a drop in the quality of service below this defined minimum, a section that requires indirect control can easily be determined.

In some embodiments, the predictive quality of service is provided by the vehicle or by a communication network. The estimation of the quality of service can be performed at the vehicle or be provided by the communication network. The latter case has the benefit that the communication network has access to a larger amount of information, such as radio maps, instant radio resource utilization, historical utilization, etc.

In some embodiments, the control data comprises a set of waypoints or one or more trajectories. When the tele-operated driving session is switched to indirect control, the automated driving function of the vehicle makes use of the control data to continue along the route. One solution for enabling the automated driving function to continue operation is to provide a trajectory that the vehicle shall follow. Another solution is to provide waypoints, which are located on a trajectory. The automated driving function then sequentially approach the various locations.

In some embodiments, trigger and stop times, trigger and stop positions, or switching signals are received. Various possibilities exist for switching the control mode from direct control to indirect control and later back to direct control. For example, trigger and stop times may be used. The trigger time corresponds to the temporal beginning of the quality of service drop period. The stop time corresponds to the temporal end of the quality of service drop period. Alternatively, trigger and stop positions may be used. The trigger position corresponds to the spatial beginning of the quality of service drop section. The stop position corresponds to the spatial end of the quality of service drop section. A further possibility is to provide dedicated switching signals at the beginning and the end of the indirect control section.

In some embodiments, an autonomous or semi-autonomous vehicle comprises an apparatus according to the teachings herein or is configured to perform a method according to the teachings herein for performing a tele-operated driving session. In this way, the vehicle shows an improved behavior when a tele-operated driving session is subject to a drop in the quality of service. The vehicle may be any type of vehicle, e.g. a car, a bus, a motorcycle, a commercial vehicle, in particular a truck, an agricultural machinery, a construction machinery, a rail vehicle, etc. More generally, the teachings herein can be used in land vehicles, rail vehicles, watercrafts, and aircrafts. This expressively includes robots and drones.

Further features of the present invention will become apparent from the following description and the appended claims in conjunction with the FIGS.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Specific references to components, process steps, and other elements are not intended to be limiting. Further, it is understood that like parts bear the same or similar reference numerals when referring to alternate FIGS.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the FIGS. may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term “processor” or “controller” should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method implemented in a control center for performing a tele-operated driving session for a vehicle equipped with an automated driving function. In a first step, a predictive quality of service for a communication between the vehicle and a control center for a route driven in a tele-operated driving session is analyzed 10. This predictive quality of service may be provided, for example, by the vehicle or by a communication network. Based on the analysis, a section of the route for which an indirect control shall be used is determined 11, e.g., by detecting a drop of the predictive quality of service below a threshold. Furthermore, control data to be used by the vehicle in the determined section of the route are determined 12. The control data may comprise, for example, a set of waypoints or one or more trajectories. At least the control data are then sent 13 to the vehicle before or after initiating a tele-operated driving session with direct control of the vehicle. For example, trigger and stop times, trigger and stop positions, or switching signals are also sent to the vehicle.

Figure 2:
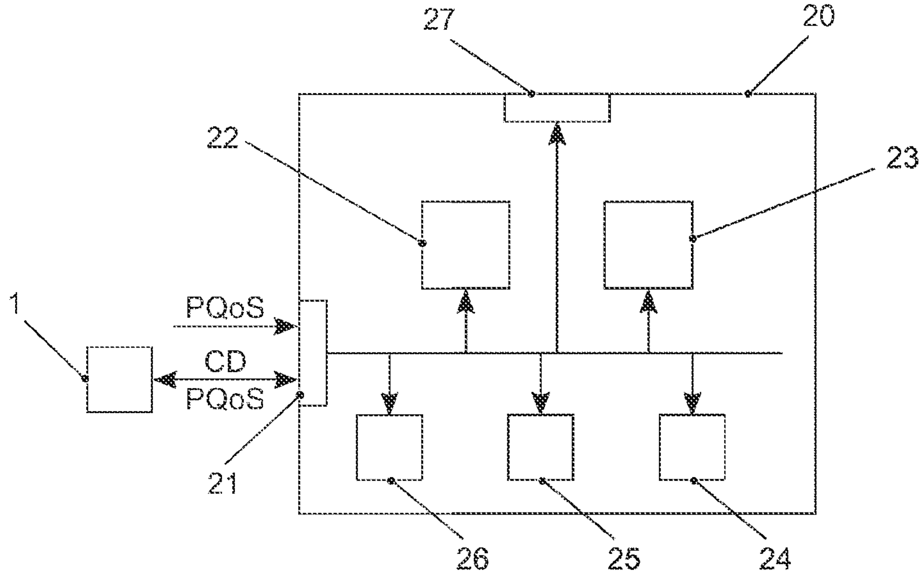
FIG. 2 schematically illustrates a first embodiment of an apparatus for use in a control center for performing a tele-operated driving session for a vehicle equipped with an automated driving function.

FIG. 2 schematically illustrates a block diagram of a first embodiment of an apparatus 20 for use in a control center for performing a tele-operated driving session for a vehicle 1 equipped with an automated driving function. The apparatus 20 has an interface 21 for receiving data, e.g., a predictive quality of service PQoS or a request by a vehicle 1 for a tele-operated driving session. The predictive quality of service PQoS may be provided, for example, by the vehicle 1 or by a communication network. An analyzing module 22 is configured to analyze a predictive quality of service PQoS for a communication between the vehicle 1 and a control center for a route driven in a tele-operated driving session. A processing module 23 is configured to determine a section of the route for which an indirect control shall be used, e.g., by detecting a drop of the predictive quality of service below a threshold, and to determine control data CD to be used by the vehicle 1 in the determined section of the route. The control data CD may comprise, for example, a set of waypoints or one or more trajectories. A communication module 24 is configured to send at least the control data CD to the vehicle 1 before or after initiating a tele-operated driving session with direct control of the vehicle 1, e.g. via the interface 21. For example, the communication module 24 is further configured to send trigger and stop times, trigger and stop positions, or switching signals to the vehicle 1. A local storage unit 26 is provided, e.g., for storing data during processing. The interface 21 may likewise be split into an input and output.

The analyzing module 22, the processing module 23, and the communication module 24 may be controlled by a controller 25. A user interface 27 may be provided for enabling a user to modify settings of the analyzing module 22, the processing module 23, the communication module 24, or the controller 25. The various modules 22-25 can be embodied as dedicated hardware units. Of course, they may likewise be fully or partially combined into a single unit or implemented as software running on a processor, e.g. a CPU or a GPU.

Figure 3:
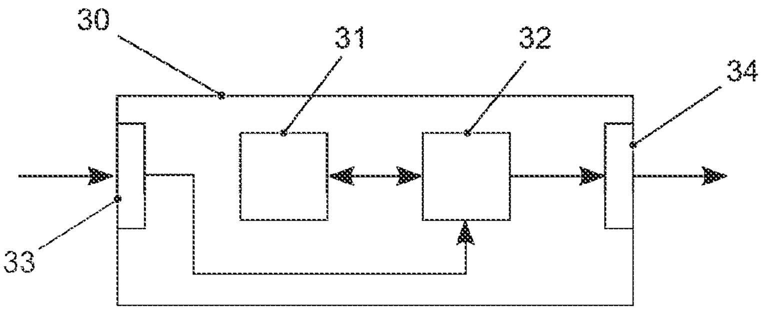
FIG. 3 schematically illustrates a second embodiment of an apparatus for use in a control center for performing a tele-operated driving session for a vehicle equipped with an automated driving function.

A block diagram of a second embodiment of an apparatus 30 for use in a control center for performing a tele-operated driving session for a vehicle equipped with an automated driving function is illustrated in FIG. 3. The apparatus 30 comprises a processing device 31 and a memory device 32. For example, the apparatus 30 may be a computer, a workstation, or a distributed system. The memory device 32 has stored instructions that, when executed by the processing device 31, cause the apparatus 30 to perform steps according to one of the described methods. The instructions stored in the memory device 32 thus tangibly embody a program of instructions executable by the processing device 31 to perform program steps as described herein according to the present principles. The apparatus 30 has an input 33 for receiving data. Data generated by the processing device 31 are made available via an output 34. In addition, such data may be stored in the memory device 32. The input 33 and the output 34 may be combined into a single bidirectional interface.

The processing device 31 as used herein may include one or more processing units, such as microprocessors, digital signal processors, or a combination thereof.

The local storage unit 26 and the memory device 32 may include volatile and/or non-volatile memory regions and storage devices such as hard disk drives, optical drives, and/or solid-state memories.

Figure 4:
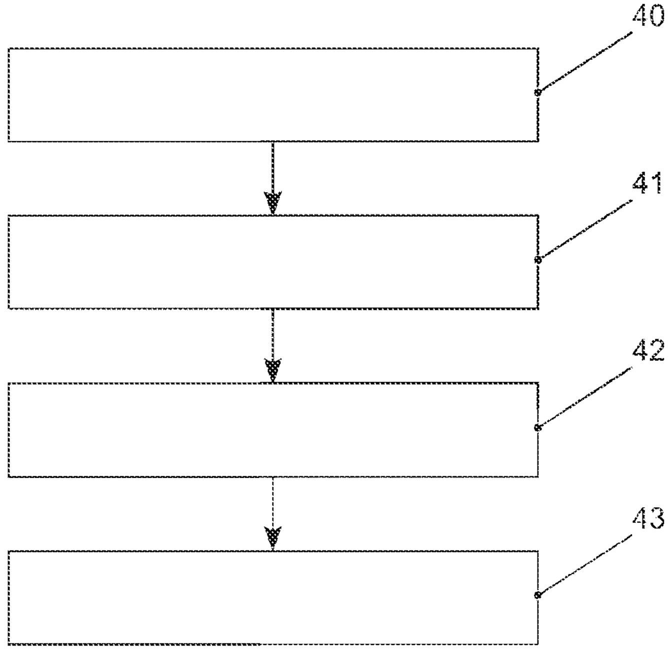
FIG. 4 schematically illustrates an example method implemented in a vehicle equipped with an automated driving function for performing a tele-operated driving session.

FIG. 4 schematically illustrates a method implemented in a vehicle equipped with an automated driving function for performing a tele-operated driving session. In a first step, a tele-operated driving session is requested 40. In response, control data for an indirect control for a section of a route driven in the tele-operated driving session are received 41. For example, the control data comprises a set of waypoints or one or more trajectories. For example, the section of the route with indirect control may be a section with a drop of a predictive quality of service below a threshold. As a basis for detecting such a drop, the predictive quality of service may be provided by the vehicle or by a communication network. When the vehicle reaches a beginning of the section of the route with indirect control, the tele-operated driving session is switched 42 from direct control to indirect control. When the vehicle reaches an end of the section of the route with indirect control, the tele-operated driving session is switched 43 from indirect control to direct control. For facilitating the switching 42, 43, trigger and stop times, trigger and stop positions, or switching signals may be received along with the control data.

Figure 5:
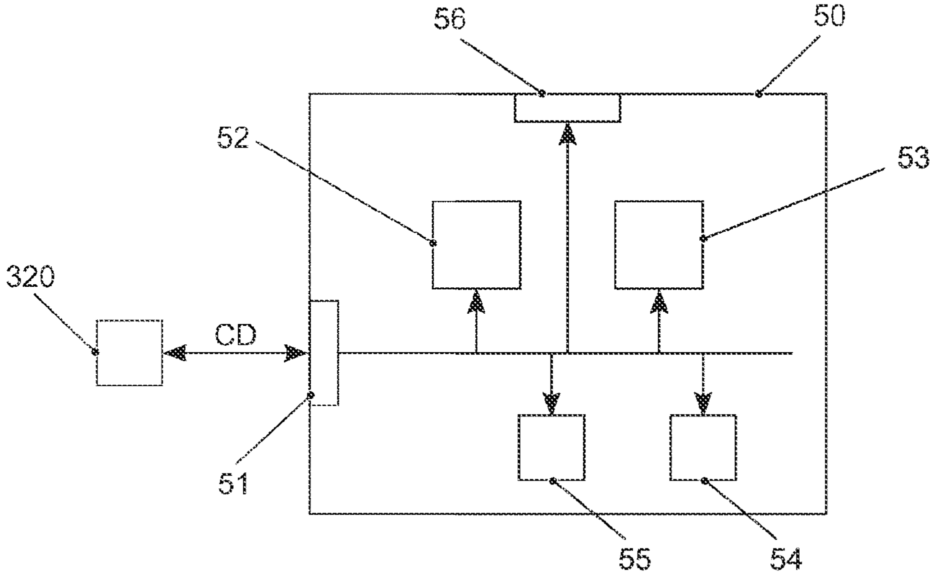
FIG. 5 schematically illustrates a first embodiment of an apparatus for use in a vehicle equipped with an automated driving function for performing a tele-operated driving session.

FIG. 5 schematically illustrates a block diagram of a first embodiment of an apparatus 50 for use in a vehicle equipped with an automated driving function for performing a tele-operated driving session. The apparatus 50 has an interface 51 for exchanging data with a control center computer 320. A communication module 52 is configured to request a tele-operated driving session and to receive control data CD for an indirect control for a section of a route driven in the tele-operated driving session. For example, the control data CD comprises a set of waypoints or one or more trajectories. For example, the section of the route with indirect control may be a section with a drop of a predictive quality of service below a threshold. As a basis for detecting such a drop, the predictive quality of service may be provided by the vehicle or by a communication network. A control module 53 is configured to switch from direct control to indirect control when the vehicle reaches a beginning of the section of the route with indirect control, and to switch from indirect control to direct control when the vehicle reaches an end of the section of the route with indirect control. For facilitating the switching by the control module 53, trigger and stop times, trigger and stop positions, or switching signals may be received along with the control data CD. A local storage unit 55 is provided, e.g., for storing data during processing. The interface 51 may likewise be split into an input and output.

The communication module 52 and the control module 53 may be controlled by a controller 54. A user interface 56 may be provided for enabling a user to modify settings of the communication module 52, the control module 53, or the controller 54. The various modules 52-54 can be embodied as dedicated hardware units. Of course, they may likewise be fully or partially combined into a single unit or implemented as software running on a processor, e.g. a CPU or a GPU.

Figure 6:
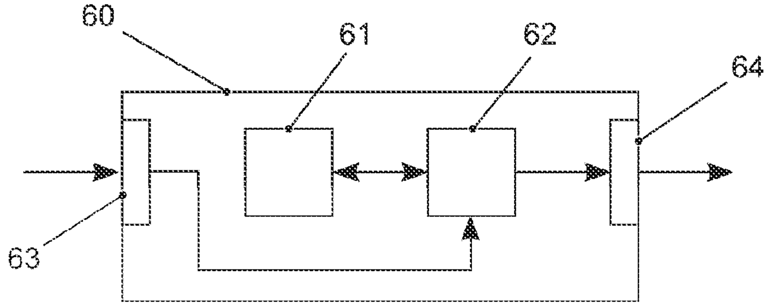
FIG. 6 schematically illustrates a second embodiment of an apparatus for use in a vehicle equipped with an automated driving function for performing a tele-operated driving session.

A block diagram of a second embodiment of an apparatus 60 for use in a vehicle equipped with an automated driving function for performing a tele-operated driving session is illustrated in FIG. 6. The apparatus 60 comprises a processing device 61 and a memory device 62. For example, the apparatus 60 may be a computer, an electronic control unit or an embedded system. The memory device 62 has stored instructions that, when executed by the processing device 61, cause the apparatus 60 to perform steps according to one of the described methods. The instructions stored in the memory device 62 thus tangibly embody a program of instructions executable by the processing device 61 to perform program steps as described herein according to the present principles. The apparatus 60 has an input 63 for receiving data. Data generated by the processing device 61 are made available via an output 64. In addition, such data may be stored in the memory device 62. The input 63 and the output 64 may be combined into a single bidirectional interface.

The processing device 61 as used herein may include one or more processing units, such as microprocessors, digital signal processors, or a combination thereof.

The local storage unit 55 and the memory device 62 may include volatile and/or non-volatile memory regions and storage devices such as hard disk drives, optical drives, and/or solid-state memories.

In the following, another embodiment shall be explained in more detail with reference to FIG. 7 to FIG. 9.

Figure 7:
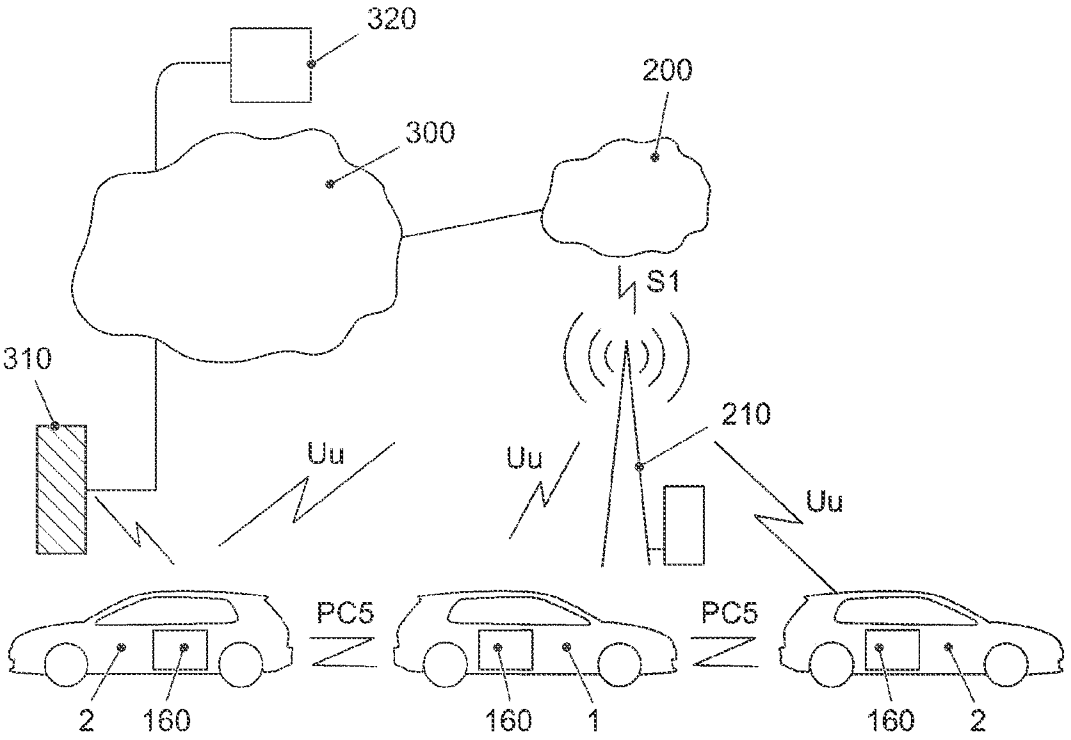
FIG. 7 illustrates a basic example architecture of a V2V and V2X communication system.

FIG. 7 illustrates a basic architecture of a V2V (Vehicle-to-Vehicle) and V2X (Vehicle-to-Everything) communication system. Reference numeral 1 denotes a vehicle, which in this example is a car, in particular a passenger car. The vehicle 1 is equipped with an on-board connectivity module 160 including a corresponding antenna such that the vehicle 1 can participate in any form of mobile communication service. As shown in FIG. 7, the vehicle 1 may transmit and receive signals to and from a base station 210 of a mobile communication service provider using a V2N (Vehicle-to-Network) communication link Uu.

Such base station 210 may be an eNodeB (Evolved Node B) base station of an LTE mobile communication service provider or a gNB (Next Generation Node B) base station of a 5G mobile communication provider. The base station 210 and the corresponding equipment are part of a mobile communication network with a plurality of network cells, where each cell is served by one base station 210.

The base station 210 in FIG. 7 is positioned close to a main road, on which the vehicle 1 is driving. Of course, other vehicles 2 may also drive on the road. In the terminology of LTE, a mobile terminal corresponds to a user equipment, which allows a user to access network services, connecting to the UTRAN (UMTS (Universal Mobile Telecommunications System) Terrestrial Radio Access Network) or Evolved-UTRAN via the radio interface. Typically, such user equipment corresponds to a smart phone. Of course, mobile terminals are also used in the vehicles 1, 2 in the form of said on-board connectivity modules 160. These on-board connectivity modules 160 are LTE, 5G, or any other communication modules, which enable the vehicles 1, 2 to receive mobile data in downstream direction and to send such data in upstream or in direct device-to-device direction.

In terms of an LTE mobile communication system, the Evolved-UTRAN consists of a plurality of eNodeBs, providing the E-UTRA user plane protocol terminations, i.e., PDCP (Packet Data Convergence Protocol), RLC (Radio Link Control), MAC, (Medium Access Control), and PHY (Physical Layer), and the control plane protocol termination, i.e., RRC (Radio Resource Control) towards the user equipment. The eNodeBs are interconnected by means of the so-called X2 interface. The eNodeBs are also connected by means of the so-called S1 interface to an EPC (Evolved Packet Core) 200, more specifically to an MME (Mobility Management Entity) by means of an S1-MME interface and to a serving gateway by means of an S1-U interface.

In relation to this general architecture, FIG. 7 shows that the eNodeB is connected to the EPC 200 via the S1 interface and that EPC 200 is connected to the Internet 300. The control center computer 320, to which the vehicles 1, 2 send messages and from which the vehicles 1, 2 receive messages, is also connected to the Internet 300. In the field of cooperative and automated driving, the control center computer 320 typically is located in a traffic control center, where the operators for the tele-operated driving sessions requested by the vehicles 1, 2 are working. Finally, also an infrastructure network component is shown, in this case a roadside unit 310. For the ease of implementation, it is considered that all components have assigned an Internet address, typically in the form of an IPv6 address, such that the packets transporting messages between the components can be routed accordingly.

The various interfaces of the LTE network architecture are standardized. In this regard, reference is made to the various LTE specifications, which are publicly available for the sake of sufficiently disclosing further implementation details.

The vehicles 1, 2 may also be equipped with means for observing their surroundings. Their sensor systems, which are used to capture the environmental objects, are based on different measuring methods, depending on the application. Widespread technologies are, among others, RADAR, LIDAR, cameras for 2D and 3D image acquisition, and ultrasonic sensors.

Since automated driving is on the rise, a lot more data needs to be exchanged among the vehicles 1, 2, e.g. using V2V communication links PC5, and also between the vehicles 1, 2 and the network. The communication systems for V2V and V2X communication need to be adapted correspondingly. The 3GPP standard setting organization has been and is releasing features for the new generation of the 5G cellular mobile communication system, including V2X features. A large panel of vehicular use cases have been designed, ranging from infotainment to cooperative driving. Depending on the application, the requirement on the access link Uu in the scope of V2N communication drastically changes. When it comes to safety-related time-critical applications such as tele-operated driving, in which a command center takes over certain driving functions of the vehicle, these requirements are the exchange of information with low latency, high data rate and high reliability.

Figure 8:
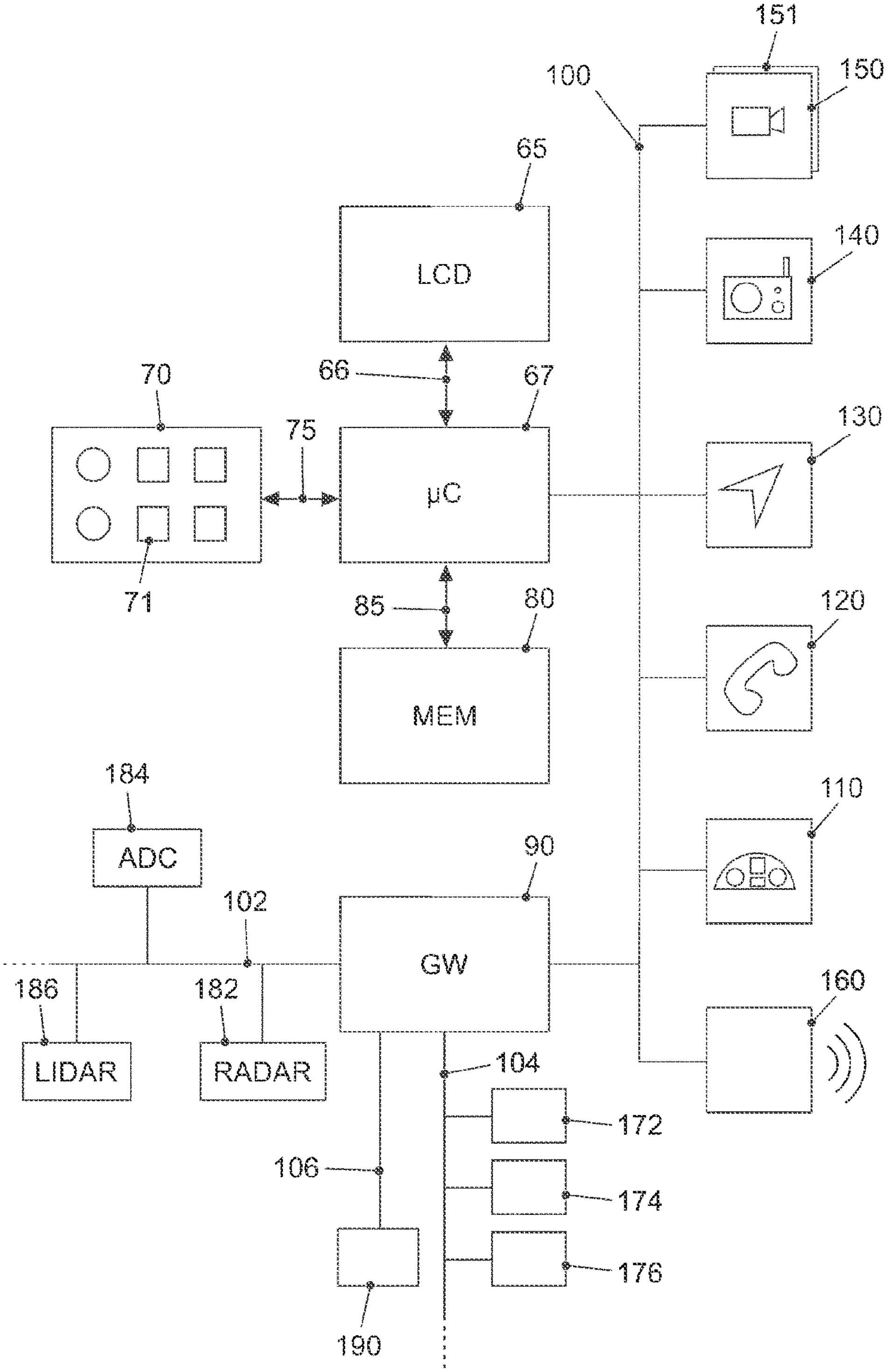
FIG. 8 shows an example block diagram of an electronics system of a vehicle.

FIG. 8 schematically shows a block diagram of a board electronics system of a vehicle. Part of the board electronics system is an infotainment system, which comprises a touch-sensitive display unit 65, a computing device 67, an input unit 70, and a memory device 80. The display unit 65 is connected to the computing device 67 via a data line 66 and includes both a display area for displaying variable graphical information and an operator interface (touch-sensitive layer) arranged above the display area for inputting commands by a user. The input unit 70 is connected to the computing device 67 via a data line 75. Reference numeral 71 designates a press button that allows a driver to manually request a tele-operated driving session if the vehicle is blocked and the driver wants the support of a tele-operated driving operator to find a way out of the blocking situation. There is no need for a dedicated press button 71 if other techniques for manual control are used. This includes selecting an option in a user menu displayed on the display unit 65, detecting the command with speech recognition, or using gesture control means.

The memory device 80 is connected to the computing device 67 via a data line 85. In the memory device 80, a pictogram directory and/or symbol directory is deposited with pictograms and/or symbols for possible overlays of additional information.

The other parts of the infotainment system, such as a camera 150, radio 140, navigation device 130, telephone 120 and instrument cluster 110 are connected via a data bus 100 with the computing device 60. As data bus 100, the high-speed variant of the CAN (Controller Area Network) bus according to ISO standard 11898-2 may be used. Alternatively, an Ethernet-based bus system such as IEEE 802.03cg can be used. Bus systems implementing the data transmission via optical fibers are also usable. Examples are the MOST Bus (Media Oriented System Transport) or the D2B Bus (Domestic Digital Bus). For inbound and outbound wireless communication, the vehicle is equipped with an on-board connectivity module 160. It can be used for mobile communication, e.g., mobile communication according to the 5G standard.

Reference numeral 172 denotes an engine control unit. Reference numeral 174 denotes an ESC (electronic stability control) unit, whereas reference numeral 176 denotes a transmission control unit. The networking of such control units, all of which are allocated to the category of the drive train, typically occurs with a CAN bus 104. Since various sensors are installed in the motor vehicle and these are no longer only connected to individual control units, such sensor data are also distributed via the bus system 104 to the individual control devices.

Modern vehicles may comprise additional components, such as further sensors for scanning the surroundings, like a LIDAR sensor 186 or a RADAR sensor 182 and additional video cameras 151, e.g., a front camera, a rear camera or side cameras. Such sensors are increasingly used in vehicles for observation of the environment. Further control devices, such as an ADC (automatic driving control) unit 184, etc., may be provided in the vehicle. The RADAR and LIDAR sensors 182, 186 may have a scanning range of up to 250 m, whereas the cameras 150, 151 may cover a range from 30 m to 120 m. The components 182 to 186 are connected to another communication bus 102, e.g. an Ethernet-Bus due to its higher bandwidth for data transport. One Ethernet-bus adapted to the special needs of car communication is standardized in the IEEE 802.1Q specification. Moreover, a lot of information about the environment may be received via V2V communication from other vehicles. Particularly for those vehicles that are not in line of sight to the observing vehicle, it is very beneficial to receive the information about their position and motion via V2V communication.

Reference numeral 190 denotes an on-board diagnosis interface, which is connected to another communication bus 106.

For the purpose of transmitting the vehicle-relevant sensor data via the an on-board connectivity module 160 to another vehicle or to a control center computer, a gateway 90 is provided. This gateway 90 is connected to the different bus systems 100, 102, 104 and 106. The gateway 90 is adapted to convert the data it receives via one bus to the transmission format of another bus so that it can be distributed using the packets specified for the respective other bus. For forwarding this data to the outside, i.e. to another vehicle or to the control central computer, the an on-board connectivity module 160 is equipped with a communication interface to receive these data packets and, in turn, to convert them into the transmission format of the appropriate mobile radio standard.

Figure 9:
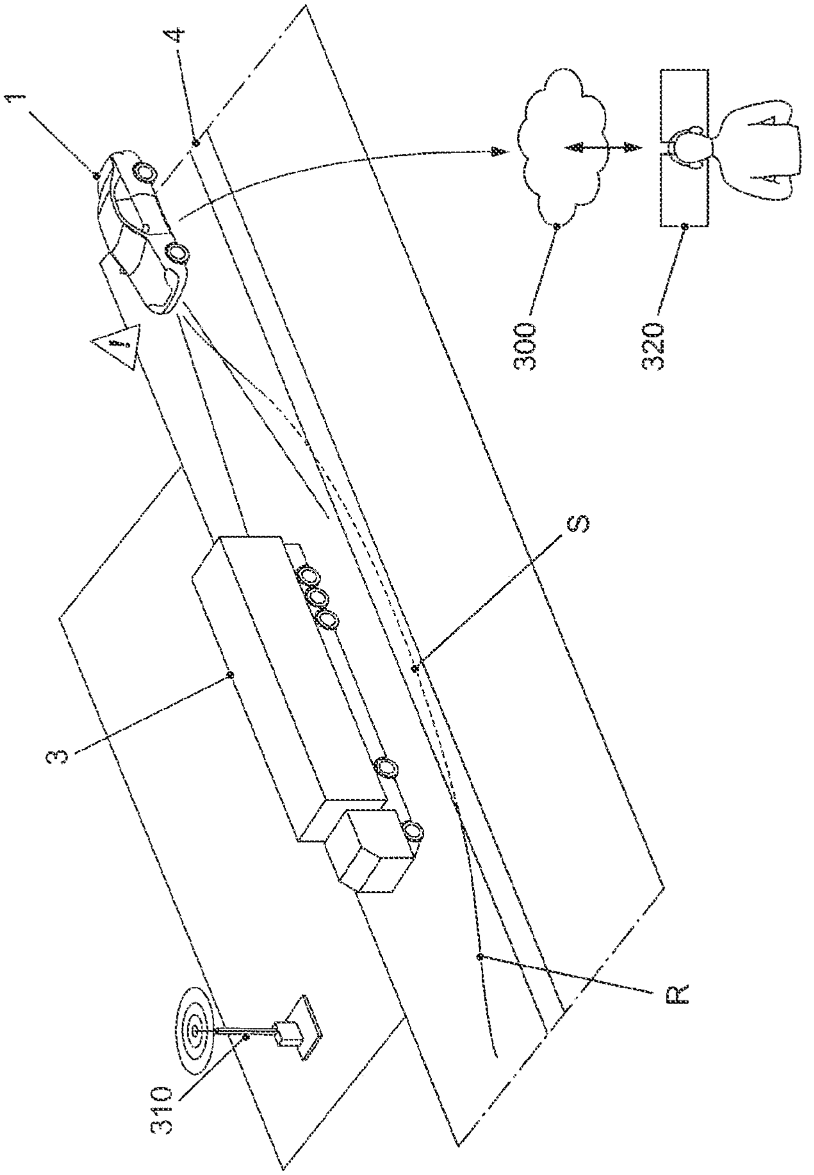
FIG. 9 shows an example situation in which a temporary switch from direct control to indirect control is needed during a tele-operated driving session.

FIG. 9 shows a situation in which a temporary switch from direct control to indirect control is needed during a tele-operated driving session. Depicted is an example of a deadlock situation, in which tele-operated driving is needed to resolve the situation. A truck 3 is blocking a one-way road. A vehicle 1 with a level 4 or 5 automated driving capability needs to pass this obstacle. The automated driving function needs to respect all traffic regulations, including traffic signs and traffic lights, etc. Since it is not an option for the automated driving function to drive over the sidewalk 4 in order to pass the truck 3, the vehicle 1 will remain behind the truck 3 and wait until the truck 3 moves on. This, however, could take hours, e.g., in case the truck 3 has stopping inadvertently due to a breakdown or a road accident. To overcome this deadlock situation, the vehicle 1 needs to drive over the sidewalk 4 in order to continue its planned route. In this situation, a tele-operated driving session under control of an external operator located in a control center with a control center computer 320 is needed. The operator can drive the vehicle 1 carefully along a route R over the sidewalk 4 in order to resolve the blocking situation. However, as can be seen the truck 3 may have a negative impact on the quality of service of a communication between the vehicle 1 and a roadside unit 310. For a certain section S of the route R, the predictive quality of service drops below a threshold necessary for a tele-operated driving session with direct control. To cope with this situation, the control center computer 320 first obtains information about the predictive quality of service along the driven route R. Furthermore, the control center computer 320 detects a drop in the predictive quality of service in this information and associate it with a spatial section S of the route R. The trajectory of the vehicle 1 for this section S of the route R is then planned as a set of waypoints or trajectories. This set of waypoints or trajectories is sent to the vehicle 1 along with a trigger and stop times for a switch between direct control and indirect control. At the trigger time, which corresponds to the beginning of the drop section S, the tele-operated driving session is switched to indirect control. At the stop time, which corresponds to the end of the drop section S, the tele-operated driving session is switched back to direct control and the operator regains access to the low-level control, i.e., to steering and throttle.

LIST OF REFERENCE NUMERALS

- 1 Vehicle
- 2 Other vehicle
- 3 Truck
- 4 Sidewalk
- 10 Analyze predictive quality of service
- 11 Determine section with indirect control
- 12 Determine control data to be used by vehicle
- 13 Send control data to vehicle
- 20 Apparatus
- 21 Interface
- 22 Analyzing module
- 23 Processing module
- 24 Communication module
- 25 Controller
- 26 Local storage unit
- 27 User interface
- 30 Apparatus
- 31 Processing device
- 32 Memory device
- 33 Input
- 34 Output
- 40 Request tele-operated driving session
- 41 Receive control data for section with indirect control
- 42 Switch to indirect control at beginning of section with indirect control
- 43 Switch to direct control at end of section with indirect control
- 50 Apparatus
- 51 Interface
- 52 Communication module
- 53 Control module
- 60 Apparatus
- 61 Processing device
- 62 Memory device
- 63 Input
- 64 Output
- 65 Display Unit

66 Data line to display unit
67 Computing device
70 Input unit
71 Press button
75 Data line to input unit
80 Memory unit
85 Data line to memory unit
90 Gateway
100 First data bus
102 Second data bus
104 Third data bus
106 Fourth data bus
110 Instrument cluster
120 Telephone
130 Navigation device
140 Radio
150 Camera
151 Further cameras
160 On-board connectivity module
172 Engine control unit
174 Electronic stability control unit
176 Transmission control unit
182 RADAR sensor
184 Automatic driving control unit
186 LIDAR sensor
190 On-board diagnosis interface
200 Evolved packet core
210 Base station
300 Internet
310 Roadside unit
320 Control center computer
CD Control data
PC5 V2V communication link
PQoS Predictive quality of service
R Route
S Section
S1 S1 interface
Uu V2N communication link The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit or device may fulfill the functions of several items recited in the claims.

The term "exemplary" used throughout the specification means "serving as an example, instance, or exemplification" and does not mean "preferred" or "having advantages" over other embodiments. The terms "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for performing a tele-operated driving session for a vehicle equipped with an automated driving function, the method comprising:

analyzing a predictive quality of service (PQOS) for a communication between the vehicle and a control center for a route driven in a tele-operated driving session;

determining a section of the route for which an indirect control shall be utilized based on the analysis of the predictive quality of service (PQoS), wherein high-level commands are utilized during indirect control, the high-level commands comprising one or more of waypoints relating to the section, modifications of an environmental model, and trajectories relating to the section;

determining control data to be utilized by the vehicle in the determined section of the route based on the high-level commands;

initiating a tele-operated driving session with direct control of the vehicle, in which steering and throttle of the vehicle are controlled by a tele-operated driving operator;

sending the control data and pre-determined trigger start and stop times or pre-determined trigger start and stop positions to the vehicle before the vehicle reaches a beginning of the section of the route with indirect control;

switching the tele-operated driving session from direct control to indirect control when the vehicle reaches the beginning of the section of the route with indirect control at the trigger start time or the trigger start position; and switching the tele-operated driving session from indirect control to direct control when the vehicle reaches an end of the section of the route with indirect control at the trigger stop time or the trigger stop position.

2. The method of to claim 1, wherein the section of the route for which an indirect control shall be utilized is determined by detecting a drop of the predictive quality of service (PQoS) below a threshold.

3. The method of claim 2, wherein the predictive quality of service (PQoS) is provided by the vehicle or by a communication network.

4. The method of claim 1, wherein the predictive quality of service (PQoS) is provided by the vehicle or by a communication network.

5. A non-transitory storage medium comprising instructions, which, when executed by a computer, cause the computer to perform the method of claim 1.

6. A system for performing a tele-operated driving session for a vehicle equipped with an automated driving function, the system comprising:

an analyzing module configured to analyze a predictive quality of service (PQoS) for a communication between the vehicle and a control center for a route driven in a tele-operated driving session;

a processor configured to determine a section of the route for which an indirect control shall be utilized based on the analysis of the predictive quality of service (PQoS), wherein high-level commands are utilized during indirect control, the high-level commands comprising one or more of waypoints relating to the section, modifications of an environmental model, and trajectories relating to the section, and to determine control data to be utilized by the vehicle in the determined section of the route based on the high-level commands; and a communication interface configured to send the control data and pre-determined trigger start and stop times or pre-determined trigger start and stop positions to the vehicle before the vehicle reaches a beginning of the section of the route with indirect control;

wherein the system is further configured to:

initiate a tele-operated driving session with direct control of the vehicle, in which steering and throttle of the vehicle are controlled by a tele-operated driving operator;

switch the tele-operated driving session from direct control to indirect control when the vehicle reaches the beginning of the section of the route with indirect control at the trigger start time or the trigger start position; and switch the tele-operated driving session from indirect control to direct control when the vehicle reaches an end of the section of the route with indirect control at the trigger stop time or the trigger stop position.

7. A method for performing a tele-operated driving session for a vehicle equipped with an automated driving function, the method comprising:

requesting a tele-operated driving session;

receiving control data for an indirect control, in which commands are utilized for a section of a route driven in the tele-operated driving session before the vehicle reaches a beginning of the section of the route with indirect control, wherein the section is determined based on an analysis of a predictive quality of service (PQOS) for a communication between the vehicle and a control center for the route, wherein the commands comprise one or more of waypoints relating to the section of the route, modifications of an environmental model, and trajectories relating to the section of the route, and receiving pre-determined trigger and start and stop times or pre-determined trigger start and stop positions;

based on the trigger start time or the trigger start position, switching the tele-operated driving session from direct control, in which steering and throttle of the vehicle are controlled by a tele-operated driving operator, to indirect control when the vehicle reaches a beginning of the section of the route with indirect control; and based on the trigger stop time or the trigger stop position, switching the tele-operated driving session from indirect control to direct control when the vehicle reaches an end of the section of the route with indirect control.

8. The method of to claim 7, wherein the section of the route with indirect control is a section with a drop of a predictive quality of service (PQoS) below a threshold.

9. The method of claim 7, wherein the predictive quality of service (PQoS) is provided by the vehicle or by a communication network.

10. A non-transitory storage medium comprising instructions, which, when executed by a computer, cause the computer to perform the method of claim 7.

11. A system for performing a tele-operated driving session for a vehicle equipped with an automated driving function, the system comprising:

a communication interface configured to request a tele-operated driving session and to receive control data for an indirect control, in which commands are utilized, for a section of a route driven in the tele-operated driving session before the vehicle reaches a beginning of the section of the route with indirect control, wherein the section is determined based on an analysis of a predictive quality of service (PQoS) for a communication between the vehicle and a control center for the route, wherein the commands comprise one or more of waypoints relating to the section of the route, modifications of an environmental model, and trajectories relating to the section of the route, and to receive pre-determined trigger start and stop times or pre-determined trigger start and stop positions; and a controller configured to switch, based on the trigger start time or the trigger start position, the tele-operated driving session from direct control, in which steering and throttle of the vehicle are controlled by a tele-operated driving operator, to indirect control when the vehicle reaches a beginning of the section of the route with indirect control, and to switch, based on the trigger stop time or the trigger stop position, the tele-operated driving session from indirect control to direct control when the vehicle reaches an end of the section of the route with indirect control.

12. A vehicle equipped with an automated driving function comprising the system of claim 11.

* * * * *